April 14, 1959     G. B. LONG     2,882,379
DOMESTIC APPLIANCE
Filed May 16, 1955     3 Sheets-Sheet 1
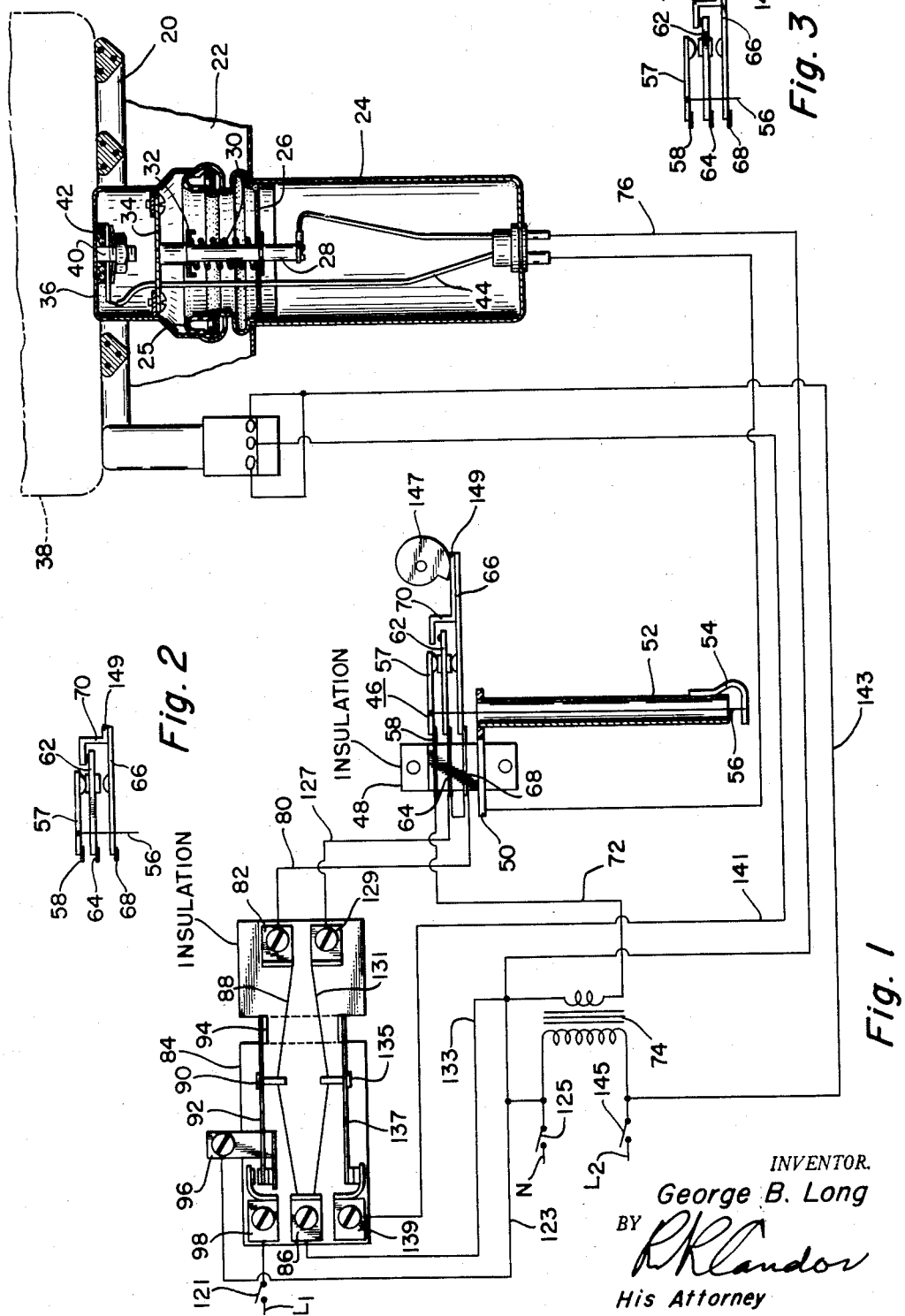
INVENTOR.
George B. Long
BY
His Attorney

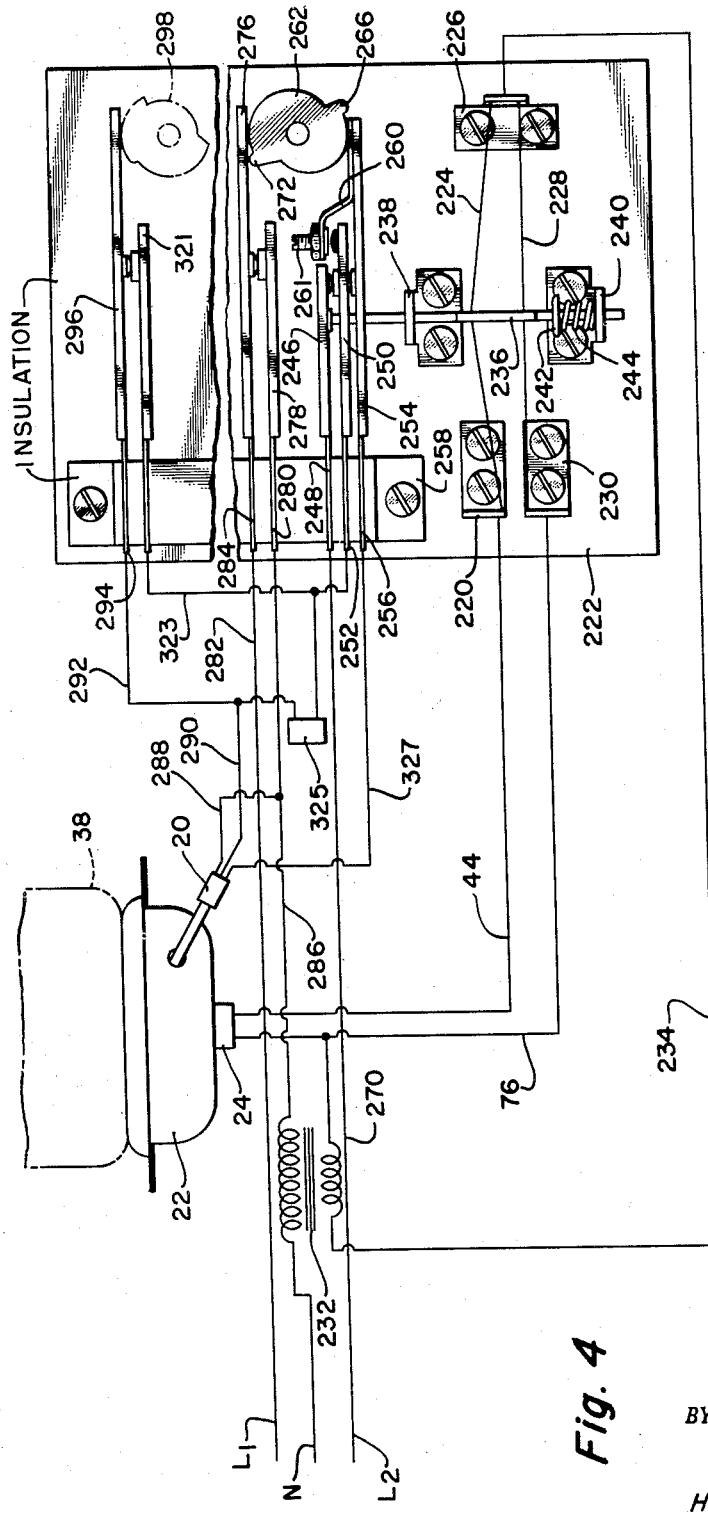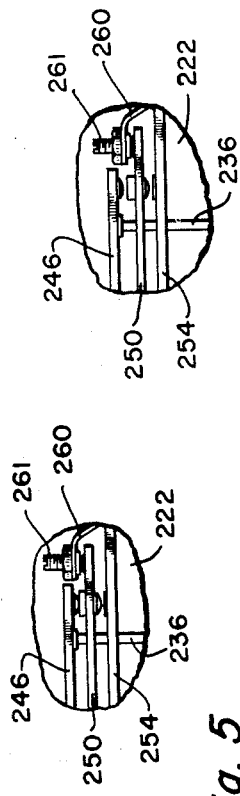

April 14, 1959  G. B. LONG  2,882,379
DOMESTIC APPLIANCE
Filed May 16, 1955  3 Sheets-Sheet 3

INVENTOR.
George B. Long
BY
R R Candor
His Attorney

United States Patent Office 2,882,379
Patented Apr. 14, 1959

2,882,379

DOMESTIC APPLIANCE

George B. Long, Dayton, Ohio, assignor to General Motors Corporation, Detroit, Mich., a corporation of Delaware Application May 16, 1955, Serial No. 508,428

7 Claims. (Cl. 219—20)

This invention relates to a domestic appliance and more particularly to thermostatic controls for surface heaters.

Difficulties in cooking could be minimized by providing a suitable temperature control for surface heaters. Recently such controls have been provided upon several expensive ranges.

It is an object of this invention to provide a simple, reliable, inexpensive temperature control for surface heaters which will quickly heat the vessel to the selected temperature and keep this temperature as long as desired without overheating or burning of food.

It is another object of this invention to increase the reliability of the temperature controls for such heaters.

It is still another object of this invention to provide a suitable arrangement wherein a thermistor may be used to control the circuit of surface heaters in response to the temperature of the vessel on the surface heater.

These and other objects are attained in the form shown in which a spring supported thermal contact element is provided within the center portion of a surface heater. This contact element is provided with a thermistor in the shape of a small disc connected in series with a two-step electro-thermal switch powered by a low voltage transformer. This two-step electro-thermal switch controls a double electro-thermal relay which first reduces the voltage applied and second, cycles the electric surface heater. Thereby the vessel is brought rapidly to the selected temperature maintained at that temperature as long as desired. In a second form, the electro-thermal switch directly controls the surface heater without the relay.

Further objects and advantages of the present invention will be apparent from the following description, reference being had to the accompanying drawings, wherein a preferred form of the present invention is clearly shown.

In the drawings:

Figure 1 is a diagrammatic view and wiring diagram of a surface heater and thermostatic control in deenergized condition embodying one form of the invention;

Figure 2 is a fragmentary diagrammatic view showing the two-step switch in an intermediate position;

Figure 3 is a view similar to Figure 2 showing the two-step switch in the open circuit position;

Figure 4 is a diagrammatic view and wiring diagram of a surface heater and a thermostatic control in deenergized condition embodying a second form of my invention;

Figure 5 is a fragmentary diagrammatic view showing the two-step switch in an intermediate position;

Figure 6 is a fragmentary view similar to Figure 5 showing the two step switch in the open circuit position;

Figure 7:
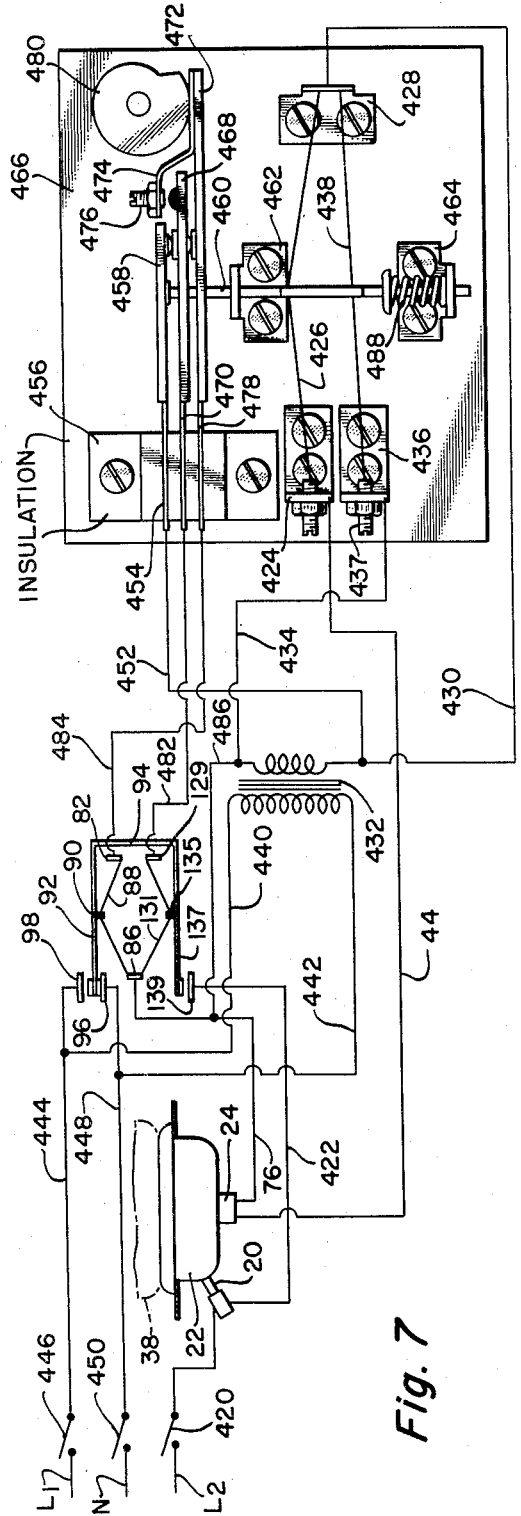
Figure 7 is a diagrammatic view and wiring diagram of a surface heater and thermostatic control in deenergized condition embodying a third form of the invention.

Referring now more particularly to Figure 1, there is shown a surface heater 20 for a range top. This heater may be of the type shown in the Tuttle Patent 2,508,552, issued May 23, 1950. Beneath this surface heater 20 is a drip pan 22 provided with a central aperture. Within this central aperture of the drip pan 22 is a mounting 24. This mounting 24 is cup-shaped and at its upper portion has a transverse strip 26 slidably receiving the pin 28. Above the strip 26 is a compression type coil spring 30 having its lower portion resting on the strip 26 and having its upper portion bearing against the spring retainer 32 fixed to the pin 28. The pin 28 is provided with a stop collar immediately beneath the strip 26 which limits the upward movement of the pin 28. The pin 28 connects to a transverse strip 34 within the inverted cup-shaped contact member 36 which is resiliently supported by the spring 30 in contact with the bottom of a vessel 38 supported by and in contact with the heater 20. A flexible resilient seal 25 of synthetic rubber extends between the mounting 24 and the member 36.

The center of this contact member 36 is provided with a downwardly extending stud 40. Mounted upon this stud 40 is a thermistor 42 in the shape of a small disc. This thermistor is held in place by a nut threaded on the stud 40. This thermistor is compacted and sintered of one or more metallic oxides of iron, manganese, nickel or cobalt which provide an electrical resistance which lowers abruptly with increasing temperatures.

The bottom surface of this thermistor 42 is connected by a plate to a conductor 44 extending downwardly through the bottom of the support 24 to a terminal support 50 of a two stage electro-thermal switch 46. This switch 46 includes a mounting 48 of insulating material provided with the terminal support 50 for a hollow tube 52 having linear expansion characteristics substantially equal to that of Nichrome wire. The bottom of this tube 52 is provided with a bracket 54 to which is connected one end of a Nichrome wire 56. This wire 56 extends upwardly through the tube 52 and is connected at its upper end to the upper contact member 57 extending in a cantilever fashion from a leaf spring 58. This leaf spring 58 is also mounted in the insulation member 48.

The wire 56 contracts when cold and pulls the contact member 57 into engagement with a cooperating middle double contact member 62. The double contact member 62 extends parallel to the contact member 57 and is mounted in cantilever fashion upon the end of a leaf spring member 64 embedded in the insulation member 48. The contact member 62 also engages a third or lower contact member 66 mounted in cantilever fashion upon the end of a leaf spring member 68 likewise embedded in the insulation member 48. These leaf spring members 58, 64 and 68 are bent or sprung upwardly to urge all the contact members 57, 62 and 66 upwardly. The contact member 66 is provided with a Z-shaped bracket 70 extending over the end of the contact member 62 so as to form a lost motion connection between the contact members 66 and 62 to limit their distance of separation. The contact member 62 is provided with an insulating button for preventing the transmission of electrical energy to the Z-shaped bracket 70.

The leaf spring member 58 is connected by the conductor 72 to the bottom low voltage terminal of a transformer 74. The upper low voltage terminal of the transformer 74 is connected by a conductor 76 which connects to the bottom of the pin 28 to complete a circuit extending through the pin 28, the transverse strip 34 and the contact member 36 to the upper face of the thermistor 42. The circuit is completed by the conductor 44 which contacts the lower face of the thermistor 42 and extends through the member 50, the tube 52, the wire 56, the contact member 57, the leaf spring 58 and the conductor 72 to the bottom low voltage output of the transformer 74. It is desirable that the wire 56 and the thermistor 42 have approximately the same electrical resistance. As the thermistor 42 rises in temperature, the current flow through this circuit including the wire 56 will increase, causing the wire 56 to be heated and lengthened. This causes the successive separation first of the middle and lower contacts 62 and 66 as shown in Figure 2 and then at a higher temperature of the upper and middle contacts 57 and 62 as shown in Figure 3.

The leaf spring 68 is connected by a conductor 80 to an L-shaped terminal 82 mounted upon a base 84 of electrical insulating material. This base 84 supports a double electrothermal relay. It includes a second fixed L-shaped terminal 86 and a section 88 of Nichrome wire extending between the top of the terminal 82 and the top of the terminal 86. The central portion of this wire section 88 is connected to a connector 90 of electrical insulating material. This connector connects to an intermediate portion of an upwardly biased cantilever double throw spring contact member 92 having one end anchored to a U-shaped cross connector 94 and provided with a double contact at its opposite end. The connector 90 holds the wire portion 88 out of the direct path between the terminals 82 and 86 so that when the wire portion 88 is cold and contracts longitudinally, it pulls the spring contact member 92 into engagement with the inwardly located contact mounted upon the terminal 96. The spring contact member 92 is biased upwardly so that when the wire section 88 is heated and expands it will move into engagement with the upwardly located contact of the terminal 98 mounted upon the adjacent corner of the base 84. The terminal 98 is connected through a conductor and a switch 121 to the live conductor $L_1$ of a three wire single phase two voltage alternating current supply. The terminal 96 is connected by a conductor 123 to a switch 125 connecting with the neutral supply conductor N. The conductor 123 also connects to one terminal of the high voltage input of the transformer 74 and to the upper terminal of the low voltage output of this transformer.

The leaf spring member 64 is connected by a conductor 127 to an L-shaped terminal 129 mounted upon the base 84. A second Nichrome wire portion 131 extends from the top of the terminal 129 to the top of the terminal 86. This terminal 86 is connected by the conductor 133 to the upper low voltage output connection of the transformer 74 to make a common junction with the conductors 76 and 123. The central portion of the wire section 131 is connected to the insulating connector 135. This connector 135 pulls the wire section 131 toward and out of the direct line between the terminals 86 and 129 as shown in Figure 1. The connector 135 connects to the downwardly biased spring contact member 137 which is biased to engage the contact support by the terminal 139 mounted upon the adjacent corner of the base 84. When the wire section 131 is cool it contacts longitudinally and pulls the spring contact member 137 toward it to separate it from the contact supported by the terminal 139. The spring contact member 137 is mounted at one end to the transverse bracket 94 which also supports the spring contact member 92.

The terminal 139 is connected by the conductor 141 to one terminal of the tubular sheathed electric surface heating unit 20. The second terminal of this surface heater 20 is connected by the conductor 143 to the switch 145 connecting with the second live terminal $L_2$ of the power supply. This switch 145 also connects with the lower high voltage input terminal of the transformer 74.

To adjust and select the temperature to be reached by the vessel 38 before the heating rate is reduced, there is provided a manually operable rotatable spiral cam 147 having its periphery in engagement with the extension 149 of the spring mounted contact member 66. When the portion of greatest radius of the cam 147 is in engagement with the end portion 149 the energization of the surface heater 20 will be reduced and terminated at the lowest temperature levels. When the cam 147 is turned to present its portion of smallest radius to the end portion 149, the heating of the vessel 38 will not be reduced and terminated until the highest temperature levels are reached. Intermediate temperature levels are obtained by intermediate portions of the periphery of the cam 147.

In operation, the placing of a vessel such as a vessel 38 upon the surface heater 20 will engage and push downwardly the contact member 36 against the force of the spring 30. Switches 121, 125 and 145 are closed. At this time all the wire portions 56, 88 and 131 are cold and in a longitudinally contracted condition. This holds the contact members 57, 62 and 66 in contact with each other as in Figure 1. Current will flow from the switch 145 through the high voltage winding of the transformer 74 to the switch 125. Also current will flow from the lower low voltage output terminals of the transformer through the conductor 72, the spring member 58, the wire 56, the bracket 54, the tube 52, the support 50 and the conductor 44 to one face of the thermistor 42. This thermistor will, at the beginning, keep the current flow at a low level. This current will flow through the thermistor 42 and the contact member 36 and the cross support 34 through the pin 28 and the conductor 76 to the upper low voltage output terminal of the transformer 74.

Current will also flow from the contact member 57 to the contact members 62 and 66 which connect through the conductors 127 and 80 to the terminals 82 and 129. The current will flow from these terminals 82 and 129 through the wire sections 88 and 131 to the terminal 86 and through the conductor 133 to the upper low voltage output terminal of the transformer 74. This low voltage current heats the wire sections 88 and 131 causing them to expand and allow the spring contact member 92 to spring upwardly into engagement with the contact connected to the terminal 98 and also to allow the spring contact member 137 to spring downwardly into engagement with the contact connected to the terminal 139.

These connections energize the surface heater 20 at maximum input as follows. Current flows from the switch 121 through the terminal 98, the spring contact member 92, the cross connector 94, the spring contact member 137, the contact and terminal 139 and the conductor 141 to one terminal of the surface heater 20. The current flows through the resistance elements of the heater 20 in parallel to the opposite terminal and thence through the conductor 143 to the switch 145. Since the switches 121 and 145 connect to the high voltage terminals $L_1$, $L_2$, the heater 20 is energized at its maximum input. This rapidly heats the vessel 38. This heat gradually raises the temperature of the thermistor 42 and provides relatively large increases in current flow through the circuit including the wire 56. This heats the wire 56 causing it to expand. The spring mounting 64 and 58 are biased to move the contact members 62 and 57 upwardly with the expansion of the wire 56 to the position shown in Figure 2. This separates the middle and lower contacts 62 and 66 thereby disconnecting the contact 66, the conductor 80 and the wire section 88 from the low voltage output of the transformer 74. This causes the wire section 88 to cool and contract thereby pulling the spring contact member 92 into contact with the contact connected to the terminal 96. This disconnects the surface heater 20 from the live supply conductor switch 121 and the supply conductor $L_1$ and connects it to the neutral supply conductor switch 125 and the supply conductor N through the terminal 96 and the conductor 123. This reduces the voltage applied to the surface heater 20 to one-half of the maximum applied voltage of 235 volts. It reduces the heating rate of the heater 20 to one-quarter the maximum rate.

If this heating rate is more than required to maintain the vessel 38 at the temperature selected by the position of the cam 147, the continued rise in temperature of the vessel 38 and the thermistor 42 will allow increased flow of current through the circuit including the wire section 56. This will increase the temperature of the wire section 56 and allow further expansion. This further expansion allows the upper spring contact member 57 to move upwardly under the force of the spring mounting 58 away from the middle contact member 62 to the position shown in Figure 3. This disconnects the middle contact member 62, the conductor 127, the terminal 129 and the wire section 131 from one of the low voltage output terminals of the transformer 74. This disconnection stops the current flow through the wire section 131 causing it to cool and contract and to pull the spring contact member 137 away from the contact connected to the terminal 139 to disconnect the center terminal of the surface heater from the supply conductors $L_1$ and N. The surface heater 20 will remain deenergized until the vessel 38 and the thermistor 48 cool sufficiently to reduce the current flow in the wire 56 enough to cause the pulling of the contact 57 back into engagement with the contact 62 as shown in Figure 2. To keep the vessel 38 at a substantially constant temperature under these conditions, the system will cycle between the contact positions shown in Figures 2 and 3.

If the heating rate under the low voltage connection is insufficient to maintain the vessel 38 at the selected temperature, the reduction in temperature of the thermistor 42 will further reduce the flow of current through the wire section 56 causing it to pull the contacts 57, 62 and 66 to the position shown in Figure 1 to again apply maximum voltage to the heater 20. To maintain the selected temperature of the vessel 38, the contacts will then cycle between the positions shown in Figures 1 and 2. The thermistor provides a method of temperature regulation which does not require extreme dimensional accuracy in manufacture to provide an accurate control. It is unlikely to fail in service and will maintain substantially constant characteristics indefinitely.

In many areas the supply line voltage fluctuates considerably. Even the operation and current flow in the hot wire relay may cause voltage fluctuations in the thermistor circuit. The forms shown in Figures 4 to 8 provide compensation for voltage fluctuations. In these arrangements the surface heater, the thermistor and its support and connections are the same as shown in Figure 1. The two-step control is somewhat similar but in each case it is provided with a second element connected in a shunt arrangement so that it is responsive to line voltage.

Rferring now more particularly to Figure 4 the conductor 44 which is connected to the thermistor in the manner shown in Figure 1 connects to a stiff substantially rigid L-shaped terminal 220 mounted upon an insulating mounting 222. The projecting portion of this L-shaped terminal 220 supports one end of a longitudinally expansible and contractible wire section 224. The other end of this wire section 224 is connected to and is adapted to deflect a projecting portion of an L-shaped terminal 226. The projecting portion of this terminal is in the form of a stiff outwardly biased cantilever leaf spring having a force of five pounds. Also connected to this projecting portion is a second longitudinally expansible and contractible wire section 228 having its opposite end connected to the projecting portion of the L-shaped terminal 230. This terminal 230 is connected by the conductor 76 to the second face of the thermistor as shown in Figure 1. It is also connected to the right end terminal of the low voltage portion of the transformer 232. The left end terminal of the low voltage portion of the transformer 232 is connected by the conductor 234 to the terminal 226. This constitutes the entire low voltage circuit of this form.

The wire section 224 is heated by and expands and contracts in accordance with the current flow through the thermistor. It is the active portion of the control and is responsive to the temperature of the thermistor and voltage supplied by the low voltage output of the transformer 232. The section 228 is the voltage compensating portion since it is heated and expanded in accordance with the current flow through it which is responsive to the voltage supplied by the low voltage output of the transformer 232. The expansion of the wire section 228 is therefore in accordance with the voltage and moves the projecting portion of this terminal 226 likewise in accordance with the voltage to compensate for the effect of the fluctuation in voltage upon the section 224. The mid-point of the wire section 224 only is connected to a vertically slidable follower 236 which is slidably mounted in the L brackets 238 and 240. The follower 236 is provided with a spring retainer 242 which is urged upwardly by a compression type coil spring 244 located between it and the bracket 240. This spring, which has a force of about one pound, keeps the wire section 224 taut and continuously urges the follower 236 in the upward direction. When the resistance of the thermistor is high, there is only a small amount of current flowing through the wire section 224. This keeps the wire section 224 contracted and keeps the control in the position shown in Figure 4. When the thermistor rises in temperature, there is a greater current flow through the wire section 224 thereby increasing its temperature and length to permit the spring 244 to move the follower 236 upwardly.

The follower 236 operates the upper switch contact member 246 connected in cantilever fashion to the leaf spring 248 which provides a downward spring bias upon the contact member 246. The contact member 246 cooperates with the middle double contact member 250 which is mounted in cantilever fashion upon the end of the leaf spring 252. There is also a lower contact member 254 mounted upon the end of a leaf spring 256. These leaf springs 248, 352 and 256 are embedded within an insulating member 258. The leaf spring 248 has a downward bias upon the contact member 246 to hold it continuously in engagement with the top of the follower 236. The leaf springs 252 and 256 provide an upward bias upon the contact member 250 and the contact member 254 to hold them in engagement with each other and in electrical contact with the upper member 246. The free end of the contact member 254 is provided with a Z-shaped bracket 260 extending around the extending free end of the contact member 250. This bracket 260 is provided with an adjustable set screw 261 adapted to make engagement with an insulating button on the projecting end portion of the contact member 250. The bracket 260 and the screw 261 provide a lost motion connection between the contact members 250, 254 to limit their separation.

These contact members 246, 250, and 254 form a two step arrangement in which the contact members 250 and 254 first separate and further movement of the follower 236 separates the contacts 246 and 250. When the temperature of the thermistor is low the wire section 224 will be longitudinally contracted holding the follower 236 down and holding contact members 246, 250, 254 in contact with each other. The position of the contact 254 is controlled by a spiral cam 262 for the purpose of determining the relationship of the temperature of the thermistor to the opening of the contacts 246, 250 and 254.

The cam 262 also has diametrically opposite projections 266 and 272. When the cam is turned to the "off" position the projection 266 and the projection 272 move into vertical alignment. This moves the contact member 254 downwardly to separate the contacts 246 and 250 and 254. This disconnects the electrical circuit from the supply conductor $L_2$. The separation of the contacts 246 and 250 separates the control circuit from its connection through the supply conductor 270 with the supply conductor $L_2$. The projection 272 raises a downwardly biased contact member 276 away from the stationary contact member 278 which is mounted upon the leaf spring 280. The contact member 276 is connected by the conductor 282 to the supply conductor $L_1$. Thus the separation of the contact members 276 and 278 disconnect the system from the supply conductor $L_1$. The contact member 276 is also mounted upon a leaf spring 284 which is sprung downwardly so as to hold it in engagement with the cam 262. The leaf spring 280 is connected by the conductor 286 to the right high voltage terminal of the transformer 232. The left high voltage terminal of the transformer 232 is connected to the supply conductor N.

The leaf spring 280 is connected by the conductor 288 to one terminal of the sheathed tubular heating unit 20. A second terminal of the sheathed heating unit 20 is connected by the conductor 290 to a conductor 292 connecting with the leaf spring 294. This leaf spring 294 connects to a contact member 296 which is downwardly biased by the leaf spring 294 against the periphery of the cam 298. The contact 296 is adapted to engage the co-operating contact 321 which connects to a conductor 323. This conductor 323 connects to the leaf spring 252. Connected across the conductors 292 and 323 is a pulsing or continuously vibrating type thermal relay 325. This relay 325 is ineffective when the contact members 296 and 321 are in the closed position. It may be of the type shown in Figures 3 and 4 of Patent 2,329,417, issued on September 14, 1943, to George C. Pearce.

When the cams 262 and 298 are in the "off" position, the projections 272 and 266 are in vertical alignment to separate the contact members 276 and 278 as well as the contact members 246 and 250. The separation of these contacts disconnects the heating circuit from the supply conductors $L_1$ and $L_2$. When the cams 262 and 298 are turned away from the "off" position to either the warm or low boil positions, the contact members 296 and 321 remain in the open position while the contacts 246, 250 and 254 are closed together as shown in Figure 4 as long as the thermistor is below the selected temperature. The contacts 276 and 278 are likewise closed. This allows current flow from the supply conductor $L_1$ through the conductors 282, the leaf spring 284, the contact members 276 and 278, the leaf spring member 280 and the conductors 286 and 288 to one terminal of the sheathed tubular heater 20. The second terminal of the heater 20 is connected by the conductor 327 to the leaf spring 256 through which current is conducted through the contacts 254, 250 and 246 and through the leaf spring 248 and the conductor 270 to the second supply conductor $L_2$.

Current also flows from the middle terminal of the heater 20 through the conductor 290, the pulsing electrothermal relay 325 to the leaf spring member 252 and the contacts 250 and 246, the leaf spring 248 and the conductor 270 to the supply conductor $L_2$. The flow of current at maximum voltage through all heating sections of the heater 20 provides a relatively high initial heating rate for warming and low boiling to rapidly bring the cooking vessel and its contents up to the desired temperature. This heating rate is reduced below the maximum heating rate obtainable by keeping open the contacts 296 and 321 for making one of the resistance sections of the heater 20 subject to the control of the pulsing electrothermal relay 325 which intermittently connects and disconnects the middle terminal of the heater 20 to and from the supply conductor $L_2$.

When the temperature of the vessel 38 upon the surface heater 20 reaches the temperature selected by the position of the cam 262, the increase in current flow allowed by the thermistor in the mounting 24 allows an increased current flow through the wire section 224 to self heat and expand this section 224. This current flow through the wire section 224 is also proportional to the voltage. However any voltage fluctuation is compensated for by a proportional voltage and current fluctuation in the wire section 228. The current fluctuation causes a proportional elongation or contraction of the section 228 which deflects the projecting portion of the terminal 226 to tension or slacken the section 224 an amount equal to the effect of voltage fluctuations upon this section. Therefore, the temperature at which the follower 236 moves upward far enough to separate the contacts 250 and 254 corresponds to the temperature selected and is independent of the applied voltage.

When the follower 236 moves upwardly, it first arranges the contacts as shown in Figure 5. Since the leaf springs bias the contacts 246 and 250 toward each other, they will remain in contact until a separating force is applied. The separation of the contacts 250 and 254 caused by the upward movement of the contact 250 while the contact 254 is held by the cam 262 disconnects the conductor 327 and the element or section connected to the lower terminal of the heater 20 from the supply conductor $L_2$. The heating of the vessel 38 then continues solely by the flow of current from the supply conductor $L_1$ through the conductor 282, the leaf spring 284, the contacts 276 and 278, the leaf spring 280 and the conductors 286 and 288 to one terminal of the heater 20. The current from the opposite terminal of the heater flows through the conductor 290, the pulsing electro-thermal relay 325, the leaf spring 252, the contacts 250 and 246, the leaf spring 248 and the conductor 270 to the supply conductor $L_2$. The pulsing of the electro thermal relay 325 may be proportioned to reduce the current flow through this heater section to ¼ or ½ of the maximum current flow as may be desired. One example of such pulsing electro thermal relay is shown in Figures 3 and 4 of the Pearce Patent 2,329,417, issued September 14, 1943. This provides a reduced amount of heat approximately sufficient for continuing the warming or low boiling.

If this heat is not sufficient to maintain the selected temperature of the thermistor range, the system will revert to the condition as shown in Figure 4 restoring the starting circuit and heating rate. If the heating rate is more than sufficient, the temperature of the thermistor will rise to allow a greater current flow through the wire section 224 providing an increased elongation thereof, allowing the follower 236 to move upwardly a greater distance to the position shown in Figure 6. This separates all three contacts 246 or 250 and 254. This disconnects all the terminals of the heating unit 20 from the live supply conductor $L_2$ to disconnect heating until the temperature of the thermistor falls within the selected range.

When it is desired to fast or high boil or fry in the vessel 38, the cams 262 and 298 are turned far enough counter clockwise to present a shorter radius to the projection of the contact member 254 to prevent the opening of the contacts 246, 250 and 254 until a higher selected temperature is reached. At the same time the cam 298 presents a shorter radius to the contact 296 allowing it to engage the contacts 321 to shunt out the pulsing electro thermal relay 325.

During the initial fast heating for fast boiling and frying, current flows from the supply conductor $L_1$ through the conductor 282, the leaf sping 284, the switch contacts 276 and 278, the leaf spring 280, the conductors 286 and 288 to the upper terminal of the heater 20. Current flows from the middle terminal of the heater 20 through the conductors 290, 292, the leaf spring 294, the contacts 296 and 321, the conductors 323, the leaf spring 252, the contacts 250 and 246, the leaf spring 248 and the conductor 270 to the supply conductor $L_2$. Current also flows from the lower terminal of the heater 20 through the conductor 327, the leaf spring 256, the contacts 254 and 250 and 246 through the leaf spring 248 and the conductor 270 to the supply conductor $L_2$. This places both sections of the heater 20 across the maximum supply of voltage to provide the maximum heating rate. Current also flows from the line L₁ through the conductor 282, the leaf spring 284, the contacts 276 and 278, the leaf spring 280, the conductor 286 and through the high voltage coil of the transformer 232 to the neutral supply conductor N.

The low voltage output of the transformer 282 impresses a voltage upon the wire sections 224 and 228 as well as the thermistor and the support 24. When the selected temperature range is reached by the vessel 38 the thermistor will allow sufficient current to flow through the wire section 224 to allow the follower 236 to move upwardly to the position shown in Figure 5 to separate the contacts 250 and 254. This will disconnect the lower temperature of the heater 20 and the conductor 327 from the supply conductor L₂ thereby reducing by one the number of heater sections energized. This lowered heating rate continues until either there is a fall or rise in temperature of the thermistor sufficient to change the two step switch to the position shown in either Figure 4 or Figure 6 to initiate a heating rate and its current flow. If the heating rate is too great, the thermistor will rise above the temperature selected thereby permitting greater current flow through the wire section 224. This will cause further elongation of the wire section 224 to increase the upward movement of the follower 236 to the position shown in Figure 6. This will deenergize the entire circuit. As soon as the vessel 38 has cooled, the thermistor reduces the current flow through the wire section 224 and moves the contacts 246, 250 and 254 to the position shown in Figure 5. The temperature will then be maintained by cycling between the positions shown in Figure 5 and Figure 6. If the heating rate is insufficient to maintain the selected temperature for the vessel 38, the system will be restored to the initial heating condition of Figure 4, restoring the maximum heating rate until the temperature of the vessel 38 is restored.

In Figure 7 a two-step thermostat control similar to Figure 4 is used with an electro-thermal relay similar to that shown in Figure 1 but illustrated diagrammatically. One terminal of the surface heating unit 20 is connected through the switch 420 to the supply conductor L₂. A second terminal of the heater 20 is connected by the conductor 422 to the terminal and contact member 139 of an electro-thermal hot wire relay similar to that shown in Figure 1 with the parts bearing the same reference characters. The conductor 44 extending from the thermistor connects to the terminal 424 provided with an adjustable set screw adjustably supporting one end of the wire section 426. The opposite end of this wire section 426 is connected to the spring terminal 428 which in turn is connected by the conductor 430 to the lower low voltage output terminal of the transformer 432. The upper low voltage output of the transformer 432 is connected by the conductor 434 to the terminal 436. Like the terminal 424, this terminal 436 has an adjustable set screw 437 connected to one end of the wire section 438. The other end of this wire section 438 is connected to the spring terminal 428. The high voltage input terminals of the transformer 432 are connected by the conductors 440 and 442 to the conductors 444 and 448 connecting through the switch 446 to the supply conductor L₁ and through the switch 450 to the neutral supply conductor N.

The lower low output terminal of the transformer 432 is also connected by the conductor 452 to a leaf spring 454 anchored in the member 456 of insulating material, the leaf spring 452 connects to and biases downward the contact member 458. This contact member 458 is biased downward into contact with the upper end of the follower 460 slidably mounted in the members 462 and 464 upon the base 466 of insulating material. The contact member 458 is adapted to engage the cooperating contact member 468 connected to the end of a leaf spring 470 also embedded in the member 456.

This spring 470 imparts an upward bias to the contact member 468. The contact member 468 is also adapted to make contact with the contact member 472.

The contact member 472 is provided with a Z-shaped bracket 474 having a set screw 476 adapted to engage an insulating button upon the extension of the contact member 468 providing a lost motion connection to limit the separation between the contact members 468 and 472. The contact member 472 is mounted upon the end of a leaf spring 478 which imparts an upward bias to hold the extreme end of the contact member 472 against the periphery of the spiral cam 480. The spiral cam adjusts the position of the contact member 472 to present a portion of large radius to provide a low opening temperature of the contacts 458, 468 and 472 or to present portions of lower radius to provide higher opening temperatures. The set screw 476 may be adjusted to vary the limit of separation of the contacts 458 and 468 relative to the contact 472.

The leaf spring 470 is connected by the conductor 482 to the terminal 129 of the electro-thermal relay. This terminal 129 connects through the wire section 131 to the terminal 86. The leaf spring 478 connects through the conductor 484 to the terminal 82 which connects through the wire section 88 also to the terminal 86. The terminal 86 is connected through the conductor 76 to one terminal of the thermistor in the mounting 24. The conductor 76 is connected by the conductor 486 to the upper low voltage output terminal of the transformer 432. This provides one low voltage circuit through the compensating wire section 438 and a second low voltage circuit through the thermistor in series with the wire section 426. The current flows through and heats the wire section 438 in accordance with voltage fluctuations to deflect the terminal 428 in an amount necessary to compensate for the effect of voltage fluctuations upon the length of the wire section 426.

When the vessel 38 is placed upon the heater 20 and the switches 420, 450 and 446 are closed, current will flow through the high voltage coils of the transformer 432. This will generate a current through the compensating wire section 438 and a second current through the wire section 426 and the thermistor in series. Low voltage current will also flow through the conductor 452 and the contacts 458, 468 and 472 and through the wire sections 88 and 131 in parallel to cause these wire sections to elongate. This allows the contact 92 to spring into engagement with the terminal 98 and the contact 137 to spring into contact with the terminal 139. This permits a current flow from the live supply conductor L₂ through the switch 420, the surface heater 20, the conductor 422, the terminal 139, the spring contact 137, the cross connection 94, the spring contact 92, the terminal 98, the conductor 444 and the switch 446 to the live supply conductor L₁. This applies maximum voltage to the surface heater 20 causing the vessel 38 to be rapidly heated.

The thermistor will also be heated providing an increasing flow of current through the wire section 426 causing it to elongate. This elongation will allow the follower 460 to move upwardly under the force of the spring 488 to separate the contacts 468 and 472. The opening of the contacts 468 and 472 will deenergize the wire section 88 causing it to cool and contract and to pull the spring contact 92 away from the terminal 98. This will reconnect the lower terminal of the surface heater 20 through the relay and the conductor 448 and the switch 450 to the neutral supply conductor N. This reduces to ½ the voltage applied to the surface heater 20 and thereby reduces the maximum wattage input to one-fourth the full amount.

If the heating rate is insufficient to maintain the temperatures of the vessel 38 and the thermistor, the system will be restored to its original condition providing the maximum wattage input. The system under such circumstances will cycle in between the two conditions. If the heating rate is more than sufficient to maintain the temperatures of the surface heater 20, the thermistor will rise in temperature allowing a greater current flow and greater elongation of the wire section 426. This allows further upward movement of the follower 460 and the contact member 468 until the contact 468 engages the set screw 476 and the contact 458 moves upward away from the contact 468 to deenergize the entire circuit excepting the transformer 432. The opening of the contacts 458 and 468 deenergizes the wire section 131 causing it to contract and pull the spring contact 137 away from the terminal contact 139 to deenergize the surface heater 20. The contacts 468 and 458 and the contacts 137 and 139 will continue to close and open to maintain the temperature of the vessel 38 at the temperatures selected by the position of the cam 480.

Figure 8:
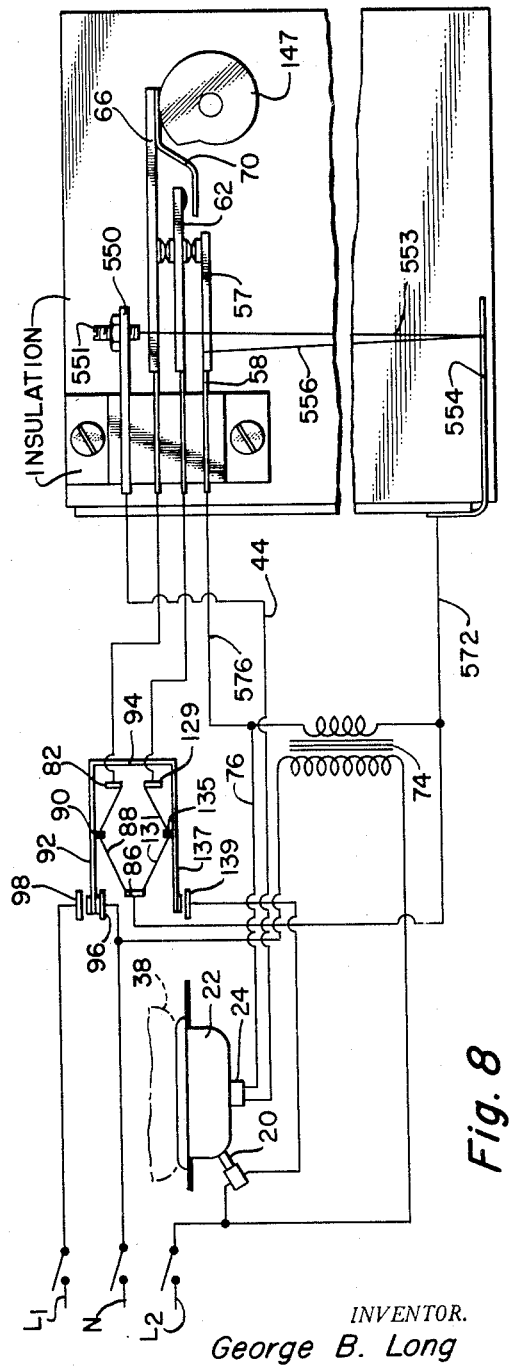
Figure 8 is a diagrammatic view and wiring diagram of a surface heater and thermostatic control in deenergized condition embodying a fourth form of the invention.

The form shown in Figure 8 is similar to the form shown in Figure 7 with the exception of the compensating arrangement and the actuating arrangement for the two-step control contacts. It is also similar to the system shown in Figure 1 excepting for the voltage compensation arrangement. The parts and conductors similar to those in Figure 1 bear the same reference characters. For simplification of the wiring diagram, the two-step thermostat is shown upside-down relative to the forms shown in Figure 1. The contact 66 located at the bottom in Figure 1 is the upper contact in Figure 8 but is adjusted by the spiral cam 147 in the opposite direction. The contact 57 is the lower contact in Figure 8 and is biased upwardly by the leaf spring 58. The intermediate contact 62 is biased downwardly by its leaf spring against the Z-shaped bracket 70 or the contact 57. The upper contact 66 is biased downwardly against the spiral cam 147. The contact 57 is held by a wire section 556. It connects to a spring anchorage 554 which tends to spring downwardly to maintain a tension upon the wire section 556. The spring anchorage 554 also holds the wire section 553 which extends upwardly and connects to a set screw 551 upon the terminal 550 which corresponds to the terminal 50 in Figure 1. This wire section 553 varys its length in accordance with the temperature of the thermistor and controls the position of the spring anchorage 554 to act effectively through the voltage compensating wire section 556 to operate the contact 57. The voltage compensating circuit extends from the upper low voltage output terminal of the transformer 74 through a conductor 576 to the leaf spring 58, the wire section 556, the spring bracket 554 and the conductor 572 to the lower low voltage output terminal of the transformer 74. The current flows from the upper low voltage output terminal of the transformer 74 through the conductor 76 and the thermistor in the mounting 24 through the conductor 44 to the terminal 550 and thence through the wire section 553 to the spring bracket 554 connected by the conductor 572 to the lower low voltage output terminal of the transformer 74.

With this arrangement, lowered voltage will contract the wire section 556 but it will also reduce the current flow through the thermistor circuit in substantially the same proportion thereby reducing the expansion of the wire section 553 repositioning spring bracket 554 and contact 57 thru wire section 556. As in Figure 1, when the thermistor is cold, the current flow through the wire 553 is low, causing it to remain contracted and holding the spring bracket 554 from downward movement. The wire section 556 allows the spring contacts 57 and 62 to remain in engagement with each other and with the contact 66 to cause current flow through both the wire sections 88 and 131 of the relay to energize the surface heater 20 at the maximum voltage to provide maximum wattage input. As the thermistor rises in temperature it will allow a greater flow of heating current through the wire 553 thereby allowing the spring bracket 554, the wire section 556 and the contact members 57 and 62 to move downwardly away from the contact 66 to deenergize the wire section 88. The consequent cooling and contraction of the wire section 88 pulls the spring contact 92 away from the terminal 98 into engagement with the terminal 96 which is connected to the neutral supply conductor N. This reduces the voltage applied to the surface heater 20 by one-half and consequently reduces the maximum wattage input to one-fourth.

Any fall in temperature of the thermistor will restore the original circuit condition but a continued rise will cause greater flow of current through the wire section 553 to cause the spring bracket 554 and wire section 556 and the spring contact 57 to continue to move downwardly until the contact member 62 engages the bracket 70 and is prevented from further downward movement. This separates the contacts 62 and 57 to deenergize the wire section 131 causing it to contract and pull the spring contact 137 away from the terminal 139 to disconnect one terminal of the surface heater 20. Any fall in temperature of the vessel 38 is maintained by cycling of the contacts 57 and 62 and 137 and 139. The maintenance of the proper temperature provides accurate preparation of food and prevents the burning of food.

In accordance with the provisions of rule 78a, reference is made to the following prior filed applications: S.N. 407,746, now abandoned, and S.N. 407,747, filed February 2, 1954, now Patent No. 2,820,129, and S.N. 481,728, filed January 14, 1955.

While the form of embodiment of the invention as herein disclosed constitutes a preferred form, it is to be understood that other forms might be adopted, as may come within the scope of the claims which follow.

What is claimed is as follows:

1. An electric heating system for heating receptacles upon the top of a support including power supply conductors, electric surface heating means adapted to support a receptacle to be heated, said surface heating means having an opening therein, a thermal contact means including a temperature responsive resistance energized from said supply conductors and located within said opening in said heating means, resilient means for urging said thermal contact means into contact with the bottom of a receptacle supported upon said heating means, a plurality of spring switch contacts located close together and sprung into separated positions for controlling said heating means, means for limiting the separation of two of the contacts, an electro-thermal expansible device responsive to the current flow through said resistance and operably connected to a third contact for moving the third contact toward the two contacts when cool and away when hot, and adjusting means for adjusting the position of one of said two contacts relative to said third contact to vary the temperature at which said resistance means is effective to control said heating means.

2. A control device including a plurality of spring mounted aligned switch contact means located close together and sprung into separated positions, means providing a lost motion connection between two adjacent contact means for limiting the separation of said two adjacent contact means of said plurality of contact means, a thermally expansible and contractible wire section connected to a third of said contact means adjacent to said two contact means for moving said third contact means into engagement with one of said two contact means and then moving into contact both of said two adjacent contact means, and means for controlling the flow of current through said wire to heat and expand said wire.

3. A control device including a plurality of spring mounted aligned switch contact means located close together and sprung into separated positions, means for limiting the separation of two adjacent contact means of said plurality of contact means, a thermally expansible and contractible wire section connected to a third of said contact means adjacent to said two contact means for moving said third contact means into engagement with said two contact means, a power source and supply circuit having a fluctuating voltage, a temperature responsive means for controlling the flow of current from said supply circuit through said wire, a second thermally expansible and contractible wire section connected to and heated by said supply circuit and responsive to said voltage supply, said second wire section being connected to change the tension upon said first mentioned wire section to compensate for fluctuating voltages in said supply circuit.

4. An electric heating system for heating receptacles upon the top of a support including power supply conductors, electric surface heating means adapted to support a receptacle to be heated, said surface heating means having an opening therein, a thermal contact means including a temperature responsive resistance energized from said supply conductors and located within said opening in said heating means, resilient means for urging said thermal contact means into contact with the bottom of a receptacle supported upon said heating means, a plurality of spring switch contacts located close together and sprung into separated positions, means providing a lost motion connection between two of the contacts for limiting the separation of said two contacts, adjusting means for adjusting the separation of said two contacts from a third of said contacts, means responsive to the current flow through said temperature responsive resistance for controlling the movement of said third contact away from the other two contacts, means for reducing the energization of said heating means in response to the separation of said two contacts, and means for deenergizing said heating means in response to the separation of the third contact from said two contacts.

5. An electric heating system for heating receptacles upon the top of a support including power supply conductors, electric surface heating means to support a receptacle to be heated, said heating means having an opening therein, a plurality of spring switch contacts located close together and sprung into separated positions for controlling said heating means, means providing a lost motion connection between two of said contacts for limiting the separation of said two contacts, a thermal contact means located within said opening in said heating means, means for urging said thermal contact means into contact with the bottom of a receptacle supported upon said heating means, temperature responsive means responsive to the temperature of said thermal means for moving the third contact toward the two contacts when the thermal means is cool and away when the thermal means is hot, and adjusting means for adjusting the position of one of said two contacts relative to the third contact to vary the relationship between the temperature of said thermal means and the opening and closing of said contacts.

6. An electric heating system for heating receptacles upon the top of a support including power supply conductors, electric surface heating means adapted to support a receptacle to be heated, said surface heating means having an opening therein, a thermal contact means including a temperature responsive resistance located within said opening in said heating means, resilient means for urging said thermal contact means into contact with the bottom of a receptacle supported upon said heating means, a plurality of spring switch contacts located close together and sprung into separated positions, means for limiting the separation of two of the contacts, an electrothermal device connected in electrical circuit with said temperature responsive resistance and energized from said supply conductors and mechanically connected to a third contact for moving the third contact toward and away from said two contacts according to the temperature of said thermal means, and a second electrothermal device connected in parallel electric circuit relationship to said thermal means and said first mentioned electrothermal device mechanically connected in opposing relationship to said first mentioned electrothermal device for compensating for variations in supply voltage.

7. A control device including a plurality of aligned switch contact means located close together and each provided with spring mountings sprung so that the contact means are inherently sprung apart into separate positions, means providing an electrically insulated lost motion connection between two adjacent spring mounted contact means for limiting their separation, a thermally expansible and contractible means connected to a third contact means adjacent to said two adjacent contact means for moving said third contact means into engagement first with one of said two contact means and thence moving into contact said two adjacent contact means, and means for adjusting the location of one of said two adjacent contact means and said lost motion connection relative to said third contact means and said thermally expansible and contractible means.

References Cited in the file of this patent

UNITED STATES PATENTS

| | | |
|---|---|---|
| 1,528,053 | Hands | Mar. 3, 1925 |
| 1,626,515 | Cook | Apr. 26, 1927 |
| 2,137,073 | Bletz | Nov. 15, 1938 |
| 2,403,824 | Newell | July 9, 1946 |
| 2,409,414 | Bletz | Oct. 15, 1946 |
| 2,510,526 | Smith | June 6, 1950 |
| 2,534,097 | Akeley | Dec. 12, 1950 |
| 2,700,083 | Harmon | Jan. 18, 1955 |
| 2,712,055 | Campbell | June 28, 1955 |
| 2,719,893 | Brady | Oct. 4, 1955 |
| 2,754,391 | Prickett | July 10, 1956 |
| 2,767,295 | Cutler | Oct. 16, 1956 |
| 2,767,296 | Welch | Oct. 16, 1956 |
| 2,781,038 | Sherman | Feb. 12, 1957 |
| 2,786,171 | Clark | Mar. 19, 1957 |